United States Patent [19]

Duck

[11] Patent Number: 5,342,094
[45] Date of Patent: Aug. 30, 1994

[54] CHECKING AND STATEMENT SYSTEM

[75] Inventor: Thomas S. Duck, Tucson, Ariz.

[73] Assignee: Canard Resources Inc., Tucson, Ariz.

[21] Appl. No.: 103,079

[22] Filed: Aug. 6, 1993

[51] Int. Cl.⁵ .......................................... B42D 15/10
[52] U.S. Cl. .................................... 283/81; 283/58; 283/117
[58] Field of Search .................. 283/57, 58, 62, 67, 283/70, 81, 117; 40/299, 625; 235/3, 17; 229/70, 75

[56] References Cited

U.S. PATENT DOCUMENTS

| | | | |
|---|---|---|---|
| 1,608,294 | 11/1926 | Beman | 283/58 |
| 1,868,188 | 7/1932 | Barker | 283/81 |
| 2,693,909 | 11/1954 | Allan | 283/58 X |
| 3,455,576 | 7/1969 | Hammerling | 283/58 X |
| 3,790,193 | 2/1974 | McBride | 283/57 |
| 4,781,322 | 11/1988 | Humm | 283/81 X |
| 4,944,532 | 7/1990 | Pollard | 283/70 |
| 4,974,878 | 12/1990 | Josephson | 283/67 |
| 5,011,559 | 4/1991 | Felix | 283/81 X |
| 5,022,683 | 6/1991 | Barbour | 283/58 |
| 5,121,945 | 6/1992 | Thomson et al. | 283/58 |

FOREIGN PATENT DOCUMENTS 2181993  5/1987  United Kingdom ................ 283/58

*Primary Examiner*—Peter Dungba Vo
*Attorney, Agent, or Firm*—Ogram & Teplitz

[57] ABSTRACT

An improved statement in which removable labels are included with the statement. These labels, although removable from the statement, adhere permanently to a negotiable instrument and provide for efficient and exacting completion of the negotiable instrument. A negotiable instrument, such as a check, contains several portions which are blank and are to be completed by the user. These blank portions include such components as: the payee's name, the amount to be paid, and a reference line. The removable labels from the statement are printed with the statement to provide permanent labels to fill-in these components by simple removal from the statement and adhesion to the check. The user simply dates and signs the check for its proper completion. Because labels are used for the critical areas of the negotiable instrument, their processing by the billing entity is more efficient (permitting machine reading of the check) and more exact since bank operators need not struggle with "poor handwriting".

20 Claims, 3 Drawing Sheets

CHECKING AND STATEMENT SYSTEM

BACKGROUND OF THE INVENTION

This invention relates generally to printed materials and more particularly to billing statements and negotiable instruments.

One of the most ubiquitous aspects of modern life is the bill or statement from the sundry institutions and companies which supply everything from water to electricity, from clothing to school tuition. The modern world would could not function without this short-term credit arrangement.

The well known procedures associated with the use of statements is that a statement is sent out to the user/consumer who then utilizes the information on the statement to complete a negotiable instrument such as a check. This creation of the negotiable instrument calls for the user to complete portions of the check which define the identification of the payee, the amount to be paid, the date of the instrument, and authorizing signature.

In many situations, the service provider also desires that an identifier number also be supplied on the negotiable instrument so that the check can be matched to a specific customer. Sometimes this identifier is a long complex arrangement of letters and numbers which requires great concentration on the part of the user in completing.

Because of the large number of checks which are completed by each household and business bi-monthly, the consumer/user becomes increasingly fatigued and irritable which causes their handwriting to degrade to a point where it is almost impossible to read or discern what is being written.

Even further, for many elderly check writers, they easily become confused and often enter conflicting information on the check. This usually occurs where the amount is to be written as a numeral and where the amount is to be written in alphabetical terms. This ambiguity results in a check being returned to the user which furthers the accounting problems.

At other times, the formal name for the payee is shortened or mis-written which also results in the check being returned without crediting of the account. This often happens when the name of the payee is extremely long or where the company is commonly known by a nick-name (i.e. Mountain Bell Telephone Company, aka "Ma Bell").

If completing of checks poses a problem for the consumer, the problem of processing the millions of checks daily by the banks and major suppliers would seem next to impossible. The supplier is faced with the problem of properly crediting the various accounts; the bank must debit the proper account and assure that the correct credit is given to the supplier.

Even in the best of situations, the reading of handwriting requires the use of human operators at the banks to enter the amounts on the checks. In some situations, the computers have been designed to automatically read the account number for the check which is combined with the human entered amount value.

Because of this approach, which is forced on the banks by the basic nature of the check, errors occur and the cost of processing the checks so that proper credit and debit are made, increases.

Typically this process falls to a mind-numbing menial task which has not much changed since the middle ages; manually read the check and entering the value in the proper column. Automating this process has proven extremely difficult and continues to a large extent to evade the ability of computer programmers.

Because of the processing problems, numerous attempts have been made to facilitate the process and to remove the chances of errors. Examples of these attempts include: U.S. Pat. No. 3,455,576, entitled "Means for Preventing Unauthorized Cashing of Checks" issued to Hammerling on Jul. 15, 1969; and U.S. Pat. No. 5,022,683, entitled "Check Insert and Envelope" issued to Barbour on Jun. 11, 1991. Hammerling utilizes colored labels for placement on the back of the checks so that a counterfeiting endorsement of the check is more difficult; Barbour creates a card support for the check so that it can be machine managed more efficiently.

In neither of these situations though is the basic problem addressed and in both of these situations there still is required the human intervention in the processing of the checks which can result in a great deal of imposed error and cost.

It is clear from the foregoing that an efficient and cost effective method of handling checks is not available and is needed.

SUMMARY OF THE INVENTION

The invention is an improved statement in which removable labels are included with the statement. These labels, although removable from the statement, adhere permanently to a negotiable instrument and provide for efficient and exacting completion of the negotiable instrument. A negotiable instrument, such as a check, contains several portions which are blank and are to be completed by the user. These blank portions include such components as: the payee's name, the amount to be paid, and a reference line.

The removable labels from the statement are printed with the statement to provide permanent labels to fill-in these components by simple removal from the statement and permanent adhesion to the check. Once the labels are affixed, the user simply dates and signs the check for it's proper completion.

This process assures that the critical areas of the check are completely and legibly completed. Elderly people are given the ability to complete a check with a minimum of writing without the worry that their handwriting will be misread by the bank or the supplier. The supplier/creditor is assured that the checks have the proper payee and amount presented.

Because labels are used for the critical areas of the negotiable instrument, their processing by the billing entity is more efficient (permitting machine reading of the check) and more exact since bank operators need not struggle with "poor handwriting". Rather, computer programming for optical character recognition is readily available for almost all printed material and even bar-code printing can be used to rapidly and efficiently identify the consumer.

To a very large extent if not totally, the processing of the checks is completed totally through automation, thereby significantly increasing the efficiency and reducing the error rate while reducing the cost and relieving humanity of this mindless crunching of numbers.

In the preferred embodiment, the labels are substantially clear with the printing on one side of the label. Once the label is permanently affixed to the check, any later attempts to manipulate the check's contents is readily and easily discerned. As example, should a counterfeiter attempt to place another payee label over the top of the completed check, the underlying payee portion is obvious to the bank and would be instantly "flagged" and reported to the proper authorities; alternatively, if the counterfeiter attempts to remove the label, the label will tear and disfigure the check rendering it void.

Removal of the label from the statement and its permanent adhesion to the check is through a variety of techniques well known to those of ordinary skill in the art. Examples of labels which will serve in this function include those shown by: U S. Pat. No. 5,071,167, entitled "Shipping and Return Mailing Label" issued to O'Brien on Dec.10, 1991; U. S. Pat. No. 4,379,573, entitled "Business Form with Removable Label and Method for Producing the Same" issued to Lomeli et al. on Apr. 12, 1983; and U. S. Pat. No. 4,082,873, entitled "Switch-Proof Label" issued to Williams on Apr. 4, 1978; all of which are incorporated hereinto by reference.

The labels are intended to be easily removed from the statement and yet permanently adhered to the negotiable instrument.

A variety of embodiments exist for the placement of the labels. The preferred embodiment has the label or labels put onto the statement form prior to its printing so that the printing process simply completes the label on the statement as it is printing the statement. A second embodiment uses a sheet holding the labels which is processed and which is sent to consumer with the statement and is associated with the statement.

In either case, the result is providing the consumer with labels to facilitate the proper completion of a negotiable instrument.

DRAWINGS IN BRIEF

Figure 2:
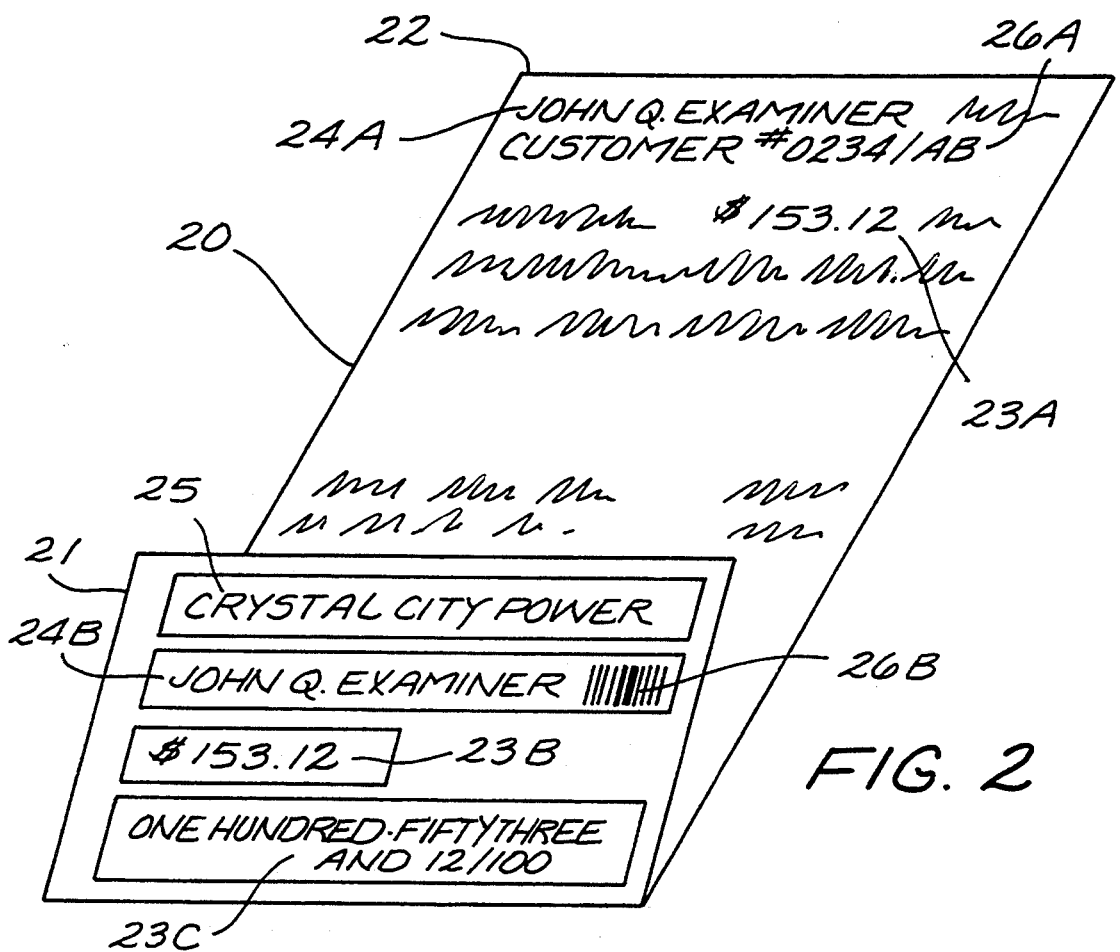

FIG. 2 a perspective view of an alternative embodiment of a statement illustrating the use of a separate component for the labels.

Figure 3:
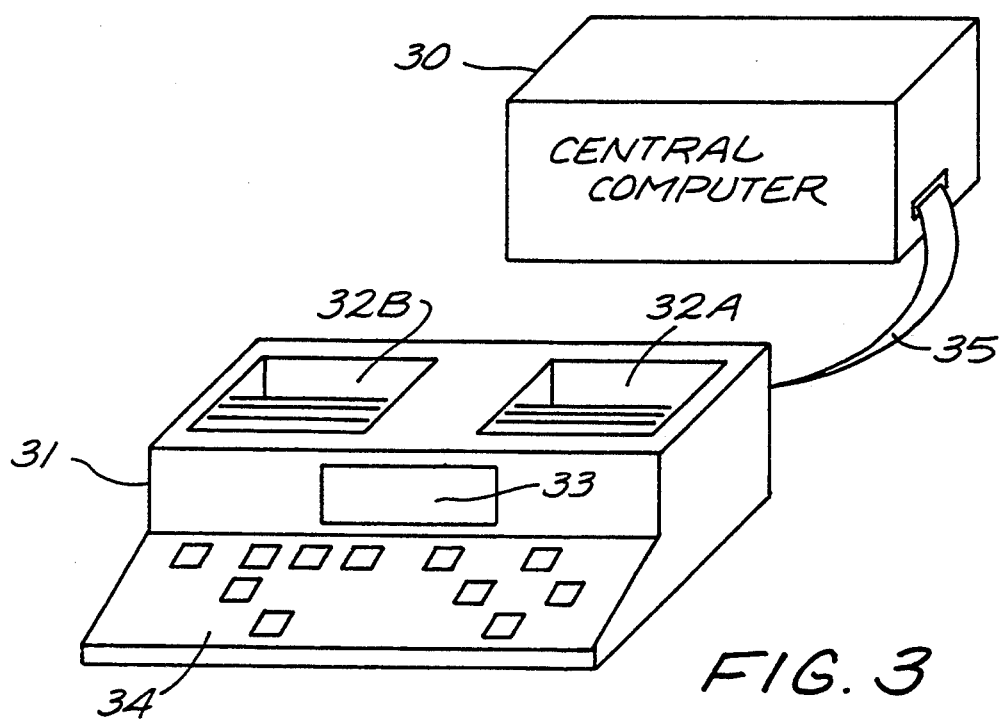

FIG. 3 is a block diagram of the preferred embodiment reading and storage apparatus as used by banks and suppliers/creditors.

Figure 4:
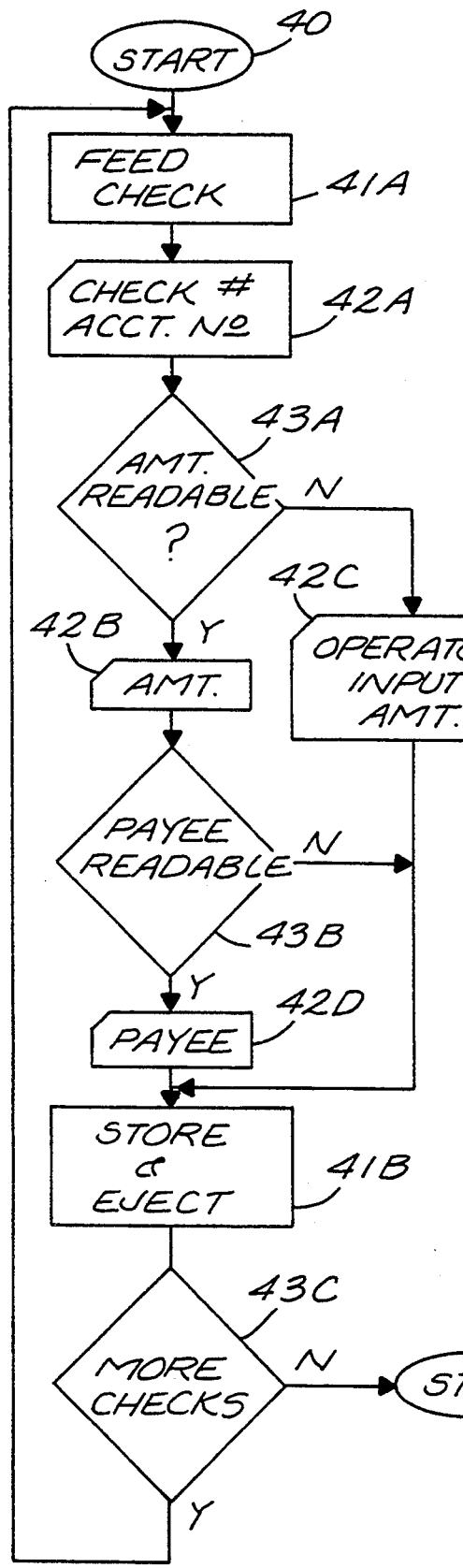

FIG. 4 is flow chart of the preferred operation of the reading and storage apparatus when used by a bank.

Figure 5:
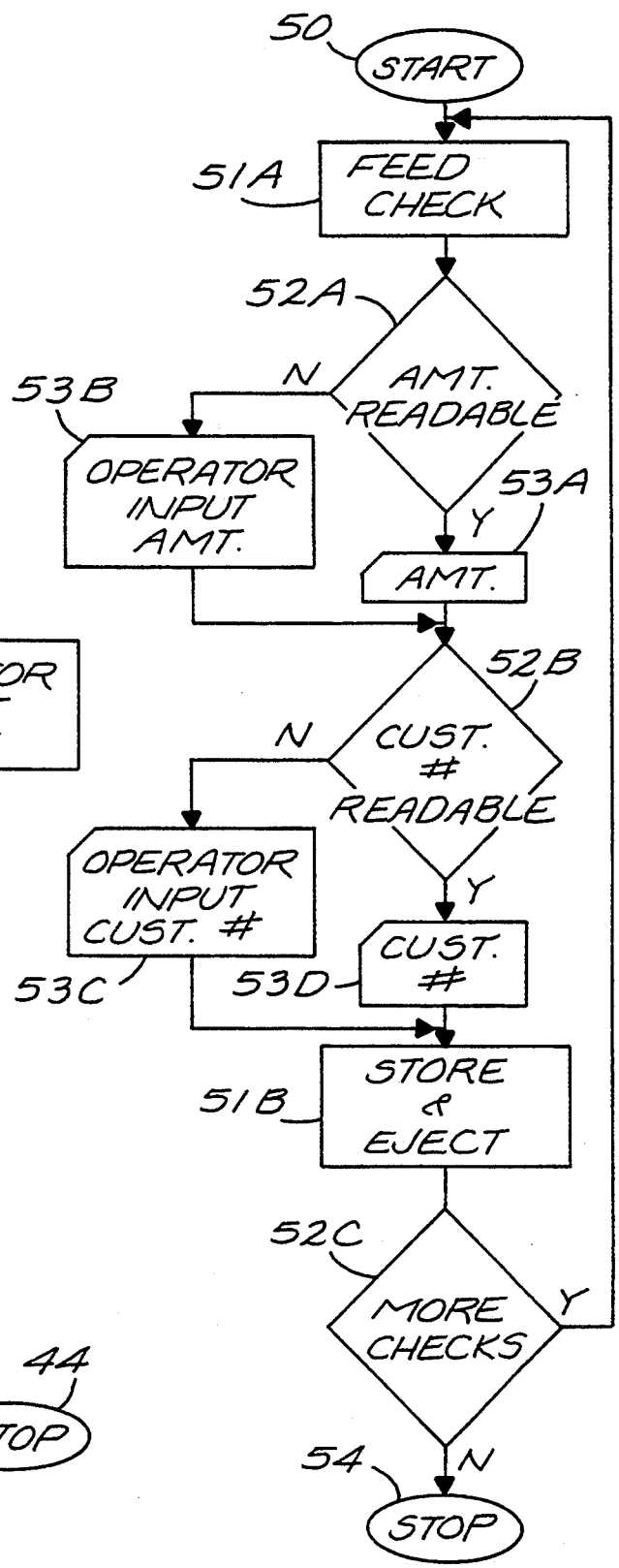

FIG. 5 is a flow chart of the preferred operation of the reading and storage apparatus when used by a supplier/creditor.

DRAWINGS IN DETAILS

Figure 1A:
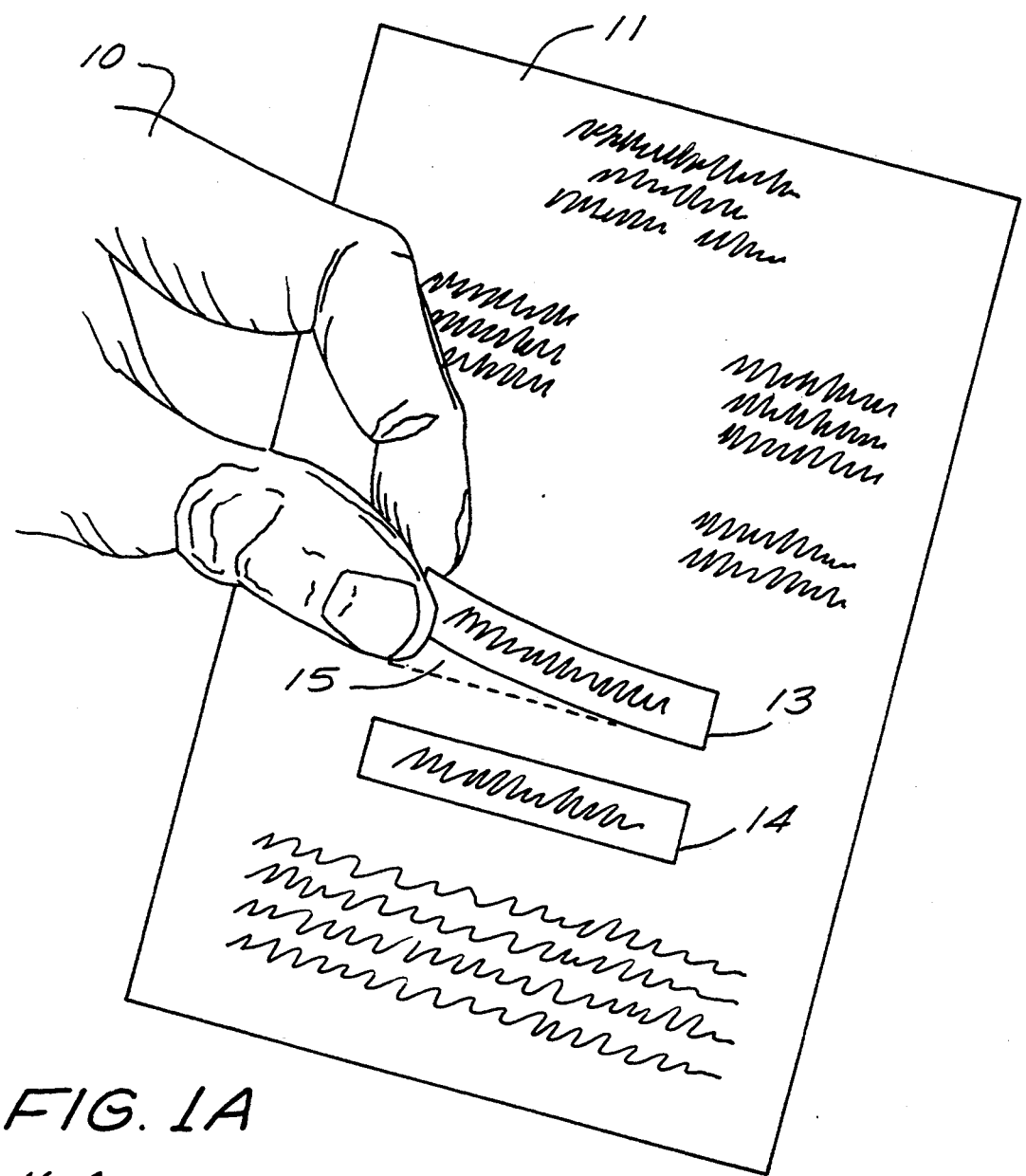
FIG. 1A is a perspective view of the preferred embodiment of the invention showing the use of the label on a statement.

FIG. 1A is a perspective view of the preferred embodiment of the invention showing the use of the label on a statement.

In this embodiment, labels 13 and 14 are detachably secured to the statement 11. User 10 is able to remove the label, as shown with label 13, through manual manipulation of the label. Labels 13 and 14 are kept from permanent adhesion to statement 11 through the use of a coating (as shown by coating 15). Through proper placement of the coating and the subsequent placement of the labels on the blank statement, the printing of the statement both prints out standard billing information for the user and also completes the labels for the user to utilize in the completion of the negotiable instrument.

Those of ordinary skill in the art readily recognize various methods and materials which will create a statement as described above.

Figure 1B:
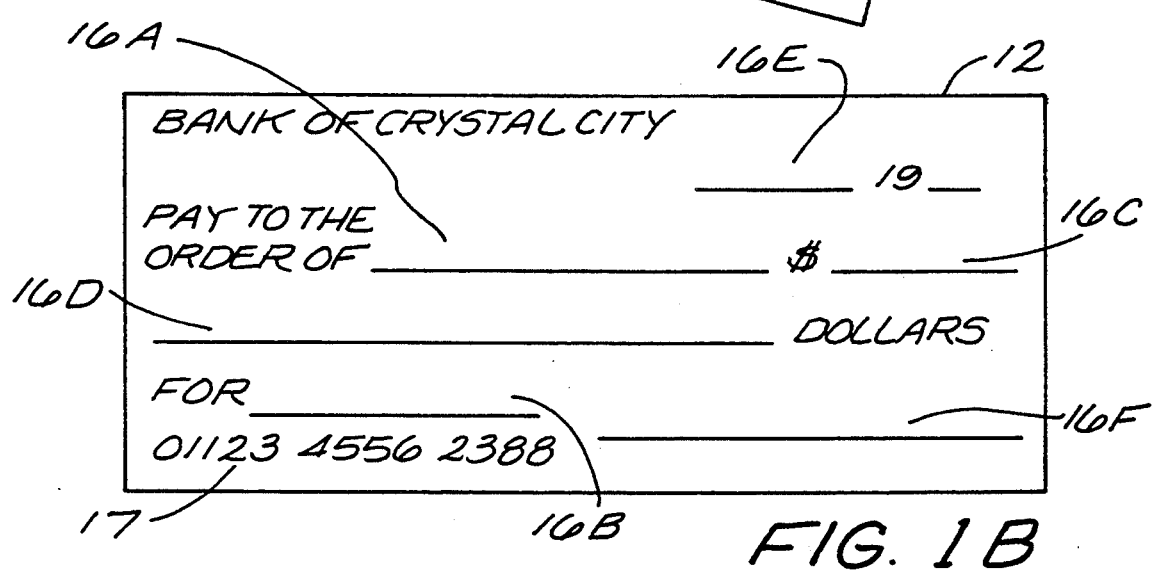
FIG. 1B is a frontal view of a typical negotiable instrument.

FIG. 1B is a frontal view of a typical negotiable instrument.

A negotiable instrument such as check 12 has a variety of areas or portions which must be completed to make the instrument negotiable. The requirements for a negotiable instrument are established through banking custom and the Uniform Commercial Code.

Typically a check 12 must have completed the date of payment 16E, the name of the ordered payee 16A, the amount to be paid both in numerals 16C and in written alphabetical form 16D, and the signature of the party making the order of payment 16F.

Additionally, most suppliers/creditors also require that their individualized assigned customer number be written on the check 12, usually in position 16B. This assures that proper credit is given to the customer by the supplier.

Bank number 17 is used by the financial institution to properly debit the account of the user.

In the preferred embodiment, when using the statement, such as illustrated in FIG. 1A, in conjunction with the check of FIG. 1B, user 10 removes the labels supplied on the statement 11 and places the labels in the correct portion of check 12.

Depending on the number of labels supplied, various areas such as payee 16A, amounts 16C and 16D, and the reference 16B, are completed; thus reducing the task for the user to simply date (16E) and sign (16F) the check to make it a negotiable instrument.

Certain banks and other financial institutions also permit the use of a single label which extends to include both the name of the payee 16A and also the numerical dollar amount 16C. As example, the label for payment to the Tucson Electric Power for the amount one hundred fifty three dollars and ten cents may read:

TUCSON ELECTRIC POWER $ 153.10

In other situations, the name may be curtailed to its letter representations with the customer's account number following. In this situation the label may read:

TEP account number 0234/A8 $ 153.10

For either of these two situations, a single label is utilized to establish and complete several portions of the negotiable instrument.

Although the present discussion relates to checks, those of ordinary skill in the art readily recognize that the present invention could also be utilized for other negotiable instruments such as a bill of exchange, a promissory note, bearer bond, or the like.

FIG. 2 is a perspective view of an alternative embodiment of a statement illustrating the use of a separate component for the labels.

In this embodiment of the statement, the labels are not on the statement 22 itself but rather are associated with the statement via attachment 21.

As noted in this figure, certain information is contained in duplicate both in the statement and also on the labels. As shown here, the customer's name appears on the statement 24A and also on the labels 24B. The amount to be paid is printed on the statement 23A, and also in numerical form 23B and alphabetical form 23C on the labels.

The customer's name is on the statement 24A and is repeated on label 24B. Note that in this embodiment, the customer number or identifier 26A (written in human readable form) is printed as bar-code indicia 26B on the labels to facilitate the ready reading of the information by machine by either the supplier's book-keeping department and/or at the bank.

Bar-Code representations can be used in several of the label embodiments and may be printed either in visible or invisible ink. The use of invisible ink, readable using ultra-violet light, is advantageous since it permits easy machine readability without undue confusion on the part of the human user.

To additionally improve the machine readability of the labels, magnetic ink is also available to enhance the machine's "vision" of the printing. This further reduces the possibility of error.

FIG. 3 is a block diagram of the preferred embodiment reading and storage apparatus as used by banks and suppliers.

In this embodiment, a multitude of readers 31 are attached to Central Computer 30 (only one reader is shown in this figure). Each reader 31 contains an input tray 32A for receipt of new checks for processing and an output tray 32B for checks which have been duly entered.

Checks from input tray 32A are drawn into the reader 31 via a feed mechanism well known to those of ordinary skill in the art and are scanned automatically to determine if the checks utilize the labels discussed above. If the labels are used, then reader 31 is able to automatically withdraw the information for proper storage within the memory of central computer 30; if the labels are not fully used, then the check is displayed in window 33 and the operator, not shown, is able to supply the proper data via keyboard 34.

In this manner, the system of FIG. 3 is able to automatically process checks which utilize the invention's label while permitting it also to handle traditionally completed checks.

FIG. 4 is flow chart of the preferred operation of the reading and storage apparatus when used by a bank.

The apparatus as shown in FIG. 3 is programmed to utilize the software discussed relative to FIG. 4, thereby addressing the entry of the check into the bank's accounting procedures.

Once the machine is started, 40, a check is fed 41A into the mechanism from the input tray. The check's number and account number are read 42A and stored into memory. Next, a determination as to whether a label has been used for the amount of the check, 43A is made. If a label has been used, the reader automatically withdraws this information from the check, 42B; otherwise, the operator must input the dollar amount 42C.

Determining if the amount is readable is simply done by attempting to read the value. An error in the read operation indicates either that a label was not used or that a defect exists and the label used is unreadable; in either case, the amount must be entered manually.

Because of the label system utilized, an additional capability available is determining if a payee name is readable 43B and then automatically reading this name 42D into memory. Currently, this capability is not available for most check writers as it would require additional work for the bank; in this case, using labels, the name of the payee is automatically withdrawn and does not require any additional effort or expense on the part of the bank.

Once all of the information is collected, the data is stored and the check is ejected to the output tray 41B.

An analysis is made to determine if there are any more checks to process 43C. If there are, then the check is fed into the mechanism 41A and the process repeats itself; if there are no more checks to process, then the process terminates 44.

In this manner, the checks are properly entered and their data is stored for handling by the accounting program.

FIG. 5 is a flow chart of the preferred operation of the reading and storage apparatus when used by a supplier/creditor.

Again, the apparatus of FIG. 3 is utilized for the entry of the data from the check, except that in this application, the data being collected is to be used by the supplier or creditor of the check writer.

Once start 50 has occurred, a check is fed into the reader 51A. A determination is made if the amount is readable 52A and that amount is automatically read 53A if possible. If the amount is not readable, then the operator must manually enter the amount 53B.

If the customer number is readable 52B, the customer number is automatically read 53D; otherwise, the operator inputs the customer number 53C.

The data so collected is then stored in the central memory and the check is ejected to the output tray 51B. Should there be more checks to process 52C, then the program returns to feed another check into the reader, 51A, and the program repeats itself; otherwise, the program terminates, In this manner, the operator is relieved of having to enter any data from checks which utilizes the present invention's check labeling system.

It is clear from the foregoing that the present invention creates a highly improved system for statement and check writing while improving on the payment processing and related banking activities.

What is claimed is:

1. A checking system comprising:
   a blank check having front and back surfaces, said front surface having a plurality of indicia imprinted thereon, said plurality of indicia being imprinted in predetermined portions of said front surface of said check defining a date portion and a signature portion and further defining at least two separate and different label portions thereon;
   a corresponding statement having front and back surfaces, said front surface of said statement having a plurality of information indicia imprinted thereon in predetermined areas, said information indicia corresponding to said plurality of indicia on said check, said front surface of said statement further including at least two separate label areas, each of said label areas detachably holding a corresponding label thereon;
   at least two separate and different labels, each of said labels being essentially substantially smaller than said check and said statement and having front and back sides, each of said back sides of said labels having an adhesive coating thereon, each of said front sides of said labels having printed indicia thereon, said printed indicia on each of said labels comprising alphabetical, numerical, or bar-code representations, said at least two labels being initially adhesively attached to said label areas of said front surface of said statement; and,
   wherein said date and signature portions provided on the front surface of said blank check are completed by a user, said at least two separate and different labels are removed from said statement by said user and each of said back sides of said labels are then permanently adhered within respective one of said separate and different label portions on said front surface of said blank check, said different printed indicia on said front sides of each of said at least two labels correlating with each other and providing essential indicia on said respective label portions of said check, thereby creating a completed negotiable check.

2. The checking system according to claim 1:
a) wherein said blank check has imprinted thereon a payee portion; and,
b) wherein one of said at least two labels has imprinted thereon a name of a payee.

3. The checking system according to claim 2 wherein said labels are substantially clear.

4. The checking system according to claim 2 wherein said check includes at least one amount payable portion for identification of an amount of said check, and wherein said statement further includes an imprinting of an amount due, and, wherein said at least two labels includes at least one amount label having an imprinting of the amount due.

5. The checking system according to claim 4 wherein said at least two amount labels includes a first amount label and a second amount label, said first amount label having numerical indicia of the amount due, said second amount label having alphabetical indicia of the amount due.

6. The checking system according to claim 2 wherein said check includes a reference portion for user identification of reference material, and wherein said statement further includes an identifier of the user, and, wherein said at least two labels include a reference label.

7. The checking system according to claim 6 wherein said reference label has imprinted thereon an indicia of said identifier.

8. The checking system according to claim 7 wherein said indicia is machine readable.

9. A checking system comprising:
a blank check having front and back surfaces, said front surface having a plurality of indicia imprinted thereon, said plurality of indicia being imprinted on predetermined portions of said front surface of said check defining a date portion, a signature portion, and at least one label portion:
a statement having front and back surfaces, said front surface of said statement having a plurality of information indicia imprinted thereon in predetermined areas, said front surface of said statement further including at least one label area;
at least one label being substantially smaller than said check and said statement and having front and back sides, each back side of said at least one label having an adhesive coating thereon, each front side of said at least one label having printed indicia thereon, said printed indicia on each of said labels being alphabetical, numerical, or bar-code representations, said at least one label being initially adhesively attached to said label areas of said front surface of said statement; and,
wherein said date and signature portions provided on the front surface of said blank check are completed by a user, and said at least one label is removed from said statement by said user and the back side of each label then permanently adhered on said front surface of said blank check and providing essential indicia on said respective label portions of said check.

10. The checking system according to claim 9
a) wherein said check has imprinted thereon at least one amount payable portion for identification of an amount of said check;
b) wherein said statement has an imprinting of an amount due; and,
c) wherein said at least one label includes at least one amount label having printed indicia of the amount due.

11. The checking system according to claim 10 wherein said amount label is substantially clear.

12. The checking system according to claim 11 wherein said at least one amount label includes a first amount label and a second amount label, said first amount label having numerical imprinting of the amount due, said second amount label having alphabetical imprinting of the amount due.

13. The checking system according to claim 9 wherein said check includes having imprinted thereon a payee portion for identification of a payee, and, wherein the statement includes an imprinting of a payee name, and wherein said at least one label includes a payee label having imprinted thereon said payee name.

14. The checking system according to claim 9 wherein said check further includes a reference portion for identification of reference material, and wherein said statement further includes an imprinting of an identifier of the user, and, wherein said at least one label includes a reference label having imprinted thereon said identifier.

15. The checking system according to claim 14 wherein said reference label having imprinted thereon a machine readable indicia of said identifier.

16. A checking system comprising:
a blank check having front and back surfaces, said front surfaces having a plurality of indicia imprinted thereon, said plurality of indicia being imprinted in predetermined portions of said front surface of said check defining a date portion and a signature portion and further defining at least portion; two separate label portion thereon;
a corresponding statement having front and back surfaces, said front surface of said statement having a plurality of information indicia imprinted thereon in predetermined areas, said information indicia corresponding to said plurality of indicia on said check, said front surface of said statement further including at least two separate label areas;
at least two separate and different labels, each of said labels being essentially substantially smaller than said check and said statement and having front and back sides, each of said back sides of said labels having an adhesive coating thereon, each of said front sides of said labels having printed indicia thereon, said printed indicia on each of said labels comprising alphabetical, numerical, or bar-code representations, said at least two labels being initially adhesively attached to said label areas of said front surface of said statement; and,
wherein said date and signature portions provided on the front surface of said blank check are completed by a user, said at least two separate and different labels are removed from said statement by said user and each of said back sides of said labels are then permanently adhered within respective one of said separate and different label portions on said front surface of said blank check, said different printed indicia on said front sides of each of said at least two labels correlating with each other and providing essential indicia on said respective label portions of said check.

17. The checking system to claim 16:
a) wherein said check has imprinted thereon a reference portion;
b) wherein said statement has imprinted thereon an indicia of a user, and, an indicia of a payee; and,
c) wherein said at least two labels include,
   1) a reference label having imprinted thereon the indicia of the user, and,
   2) a payee label having imprinted thereon the indicia of a payee.

18. The checking system according to claim 17 wherein said indicia of a user and the indicia of a payee are machine readable.

19. The checking system according to claim 17 wherein said check includes at least one amount payable portion for identification of an amount of said check, and wherein said statement further includes an imprinting of an amount due, and, wherein said at least two labels includes at least one amount label having imprinted thereon the amount due.

20. The checking system according to claim 19 wherein said at least one amount label includes a first amount label and a second amount label, said first amount label having numerical imprinting of the amount due, said second amount label having alphabetical imprinting of the amount due.

* * * * *

UNITED STATES PATENT AND TRADEMARK OFFICE
CERTIFICATE OF CORRECTION

PATENT NO. : 5,342,094

DATED : August 30, 1994

INVENTOR(S) : Thomas S. Duck

It is certified that error appears in the above-indentified patent and that said Letters Patent is hereby corrected as shown below:

Column 6, line 29, after "terminates," insert --54.--.

Column 9, line 6, after "system," insert --according--.

Signed and Sealed this

Sixth Day of December, 1994

Attest:

BRUCE LEHMAN

*Attesting Officer*   *Commissioner of Patents and Trademarks*